(No Model.) 2 Sheets—Sheet 1.

E. N. BEECHER.
NUT TAPPING MACHINE.

No. 340,191. Patented Apr. 20, 1886.

Witnesses:
J. Edward Ludington
George P. Salisbury

Inventor
Edwin N. Beecher
per Geo. Terry
Atty

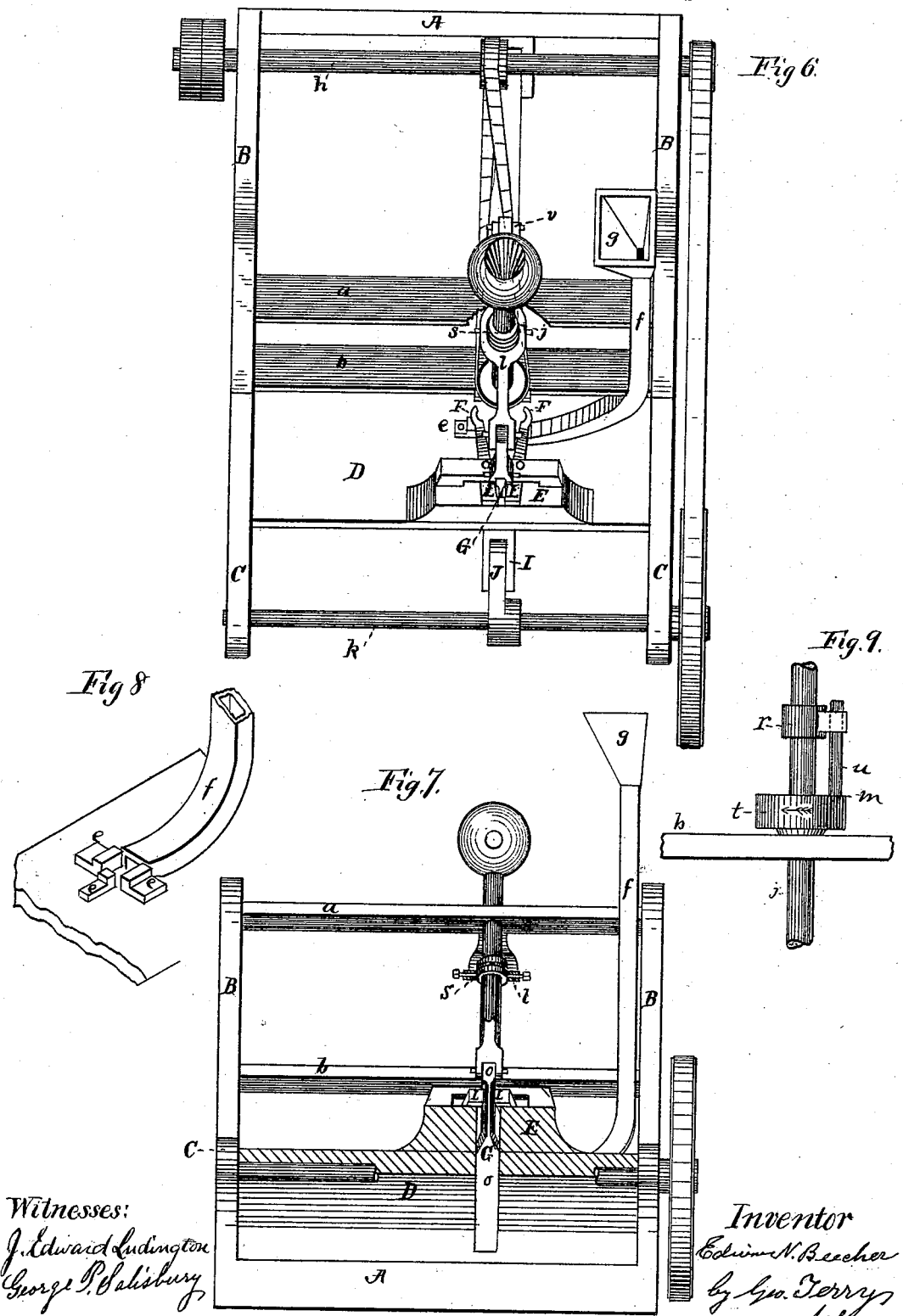

UNITED STATES PATENT OFFICE.

EDWIN N. BEECHER, OF SOUTHINGTON, CONNECTICUT.

NUT-TAPPING MACHINE.

SPECIFICATION forming part of Letters Patent No. 340,191, dated April 20, 1886

Application filed November 11, 1885. Serial No. 182,403. (No model.)

*To all whom it may concern:*

Be it known that I, EDWIN N. BEECHER, a citizen of the United States, residing at Southington, in the county of Hartford and State of Connecticut, have invented certain new and useful Improvements in Machines for Tapping Nuts, of which the following is a specification, reference being had therein to the accompanying drawings, in which—

Figure 3:
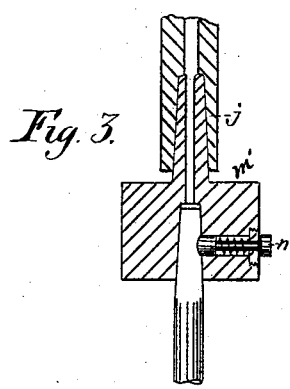
Figure 1:
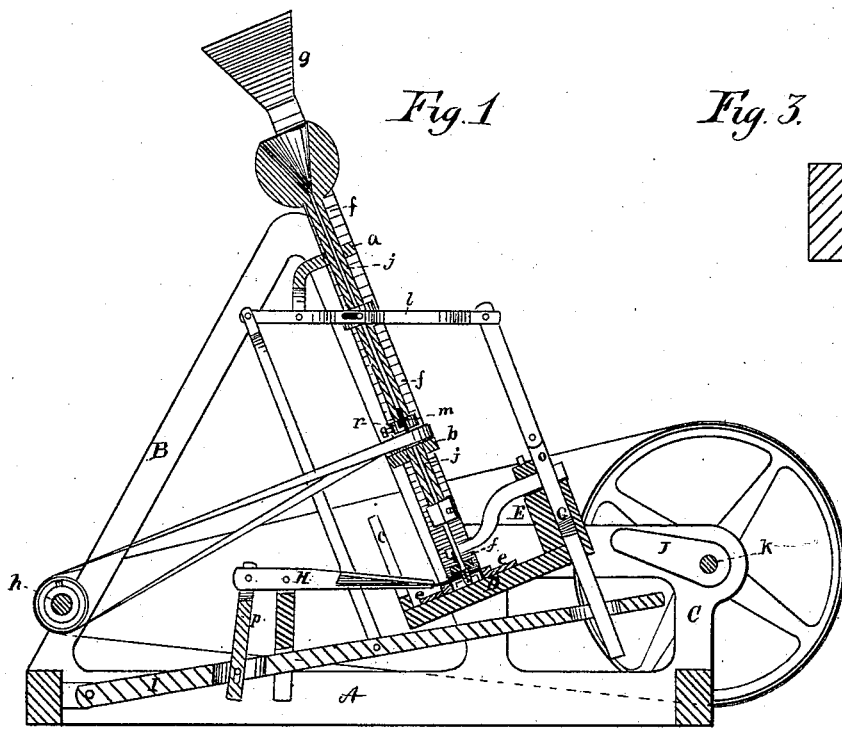
Figure 4:
Figure 2:
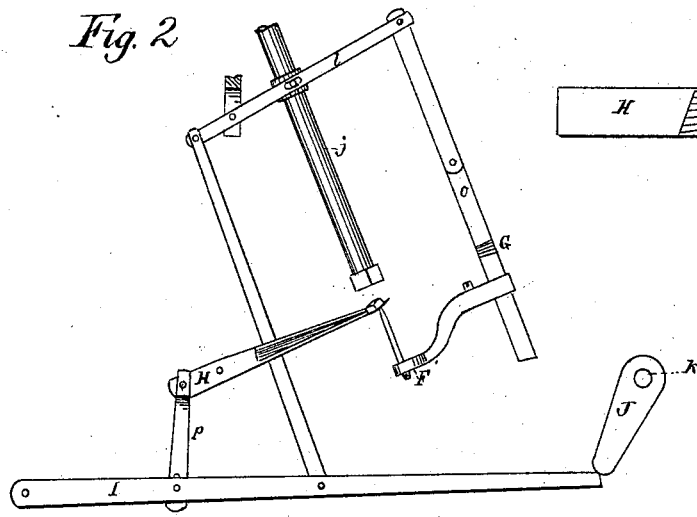
Figure 5:
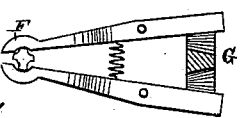

Figure 1 is a vertical section of my machine from front to rear, and shows the parts in the position they occupy when the nut is tapped. Fig. 2 is a side elevation of the principal working parts in the position they are in as the nut is passing over the top of the tap. Fig. 3 is a section of the lower end of the shaft of the chuck for holding the tap and of the upper end of the tap. Fig. 4 is a view of the lever and fingers which "strip" the nut off the tap. Fig. 5 is a plan view of the jaws which hold the tap. Fig. 6 is a plan view of the machine, and Fig. 7 is a front end elevation of the same with the part E and the bed D in section. Fig. 8 is an enlarged view of the lower end of the chute and of the parts e, and Fig. 9 is a view of the clutch and a portion of the tap-shaft.

My invention relates to machines for tapping nuts, the object being an improved automatic machine.

To enable others to make and use my machine, I will give a detailed description of the same.

The frame A is square at the base, and has two upright parts, B—one on each side of the frame—and the parts C, in which the cam-shaft k bears. Connecting the upright parts B are two cross-bars, a and b, in which the tap-shaft j bears. The bed D is an oblong plate, which is at right angles to the tap-shaft and secured at each end to the frame. On the front side of the bed-plate D is the part E, Figs. 6 and 7, in which the jaws F are pivoted, and in which the wedge or slide for moving the jaws has its bearing. On the rear side of the bed D are two guides, c, Fig. 1, one only of which is shown, between which the finger-lever H moves up and down. The three pieces e, Fig. 8, fastened to the bed, hold the nut from turning while it is being tapped. The jaws F, Fig. 5, which hold the tap by the threaded end while the nut is removed over the upper end, are formed on the end of two levers, L, which are pivoted on the part E, Figs. 1, 6, 7, and which curve downwardly toward the bed. The jaws are brought together by spreading the levers at the upper end by means of the wedge G, Fig. 7, and when the wedge is withdrawn they are opened by the spring shown in Fig. 5. A chute, f, conducts the nuts down from the hopper g onto the bed between the parts e. The driving-shaft h turns in bearings in the rear part of the frame, and has two pulleys on it, Fig. 6, one of which drives the tap-shaft j and the other the cam-shaft k. The tap-shaft j turns in boxes in the cross-bars a and b, and has an intermittent rotary movement, and also a sliding movement. It is hollow throughout its length, and has a weight at its upper end, which is tunneled out to hold oil, which flows down through the hollow shaft to lubricate the tap. A collar, s, formed on the shaft is the means by which the shaft is raised by the lever l, and the shaft is rotated by the clutch m, driven by a belt from the shaft h. In the lower end of the shaft is inserted the taper stem of a chuck, m', Fig. 3, for holding the tap. The tap is held from dropping out of the chuck by the catch n, the catch being so made that the tap may be pulled out.

The clutch m, Fig. 9, is made by inserting a pin, u, in the loose pulley t, which engages a lug on the collar r, fastened to the shaft. As the shaft is raised, the pin u is of such length that the shaft will stop turning before the jaws F grip the tap, (see Fig. 1,) and as the shaft is lowered it will not begin to turn until after the tap is released by the jaws, but before the tap enters the nut. This is essential to avoid breaking the tap. The lever I is hinged to a projection in the rear part of the frame, and is the means for moving the lever l and the finger-lever H. It is moved downward by the cam J. The finger-lever H is pivoted to an upright attached to or made in one piece with the frame, (shown in section in Fig. 1,) and is moved by lever I through connecting-rod p. It swings between guides c, and on the end are two fingers, which pass under the nut to lift it over the upper end of the tap. When the nut is at the upper end of the tap, Fig. 2, the lever H is inclined enough to make the nut slide along the top of the lever to where the lever is beveled to one side, at which place it will slide off. The connecting-rod p, Fig. 1, is slotted at its lower end, so that it does not raise the finger-lever until the tap has been raised a short distance. This is necessary to allow the fingers to swing in under the nut. The lever l swings in a part fastened to or made in one piece with the cross-bar a, and said lever l is the means for lifting the shaft and moving the slide o. It is actuated by a rod, v, connecting it with lever I.

The operation of the machine is as follows: The nuts are conducted down through the chute between the parts e, and one of them is threaded by the tap. It is then raised by the upward motion of the tap and shaft, and the fingers pass under it. The tap is then seized by the jaws F, which separate it from the shaft, and the nut is then lifted by the fingers over the upper end of the tap. The shaft, descending, connects with the tap again, and the operation is repeated.

Having described my invention and its mode of operating, what I claim as new, and desire to secure by Letters Patent, is—

1. The hollow shaft j, provided with a collar, s, in combination with the lever l, connecting-rod v, lever I, and cam J on the shaft k, as set forth.

2. The levers L, provided with jaws F on their lower ends, as described, in combination with the wedge G on slide o, the lever l, connecting-rod v, lever I, and cam J on shaft k, as set forth.

3. The finger-lever H, in combination with connecting-rod p, lever I, and cam J on shaft k, as set forth.

4. The hollow shaft j and chuck m', provided with the catch n, as described, in combination with the clutch m on the shaft j.

In testimony whereof I affix my signature in presence of two witnesses.

EDWIN N. BEECHER.

Witnesses:
GEORGE TERRY,
J. EDWARD LUDINGTON.